United States Patent [19]

Angermaier

[11] Patent Number: 5,613,473
[45] Date of Patent: Mar. 25, 1997

[54] METHOD OF IDENTIFYING THE STROKE POSITIONS IN AN INTERNAL COMBUSTION ENGINE UPON STARTUP

[75] Inventor: Anton Angermaier, Landshut, Germany

[73] Assignee: Siemens Aktiengesellschaft, Munich, Germany

[21] Appl. No.: 645,239

[22] Filed: May 13, 1996

Related U.S. Application Data

[63] Continuation-in-part of Ser. No. 296,955, Aug. 26, 1994, abandoned.

[30] Foreign Application Priority Data

Aug. 26, 1993 [EP] European Pat. Off. .............. 93113673

[51] Int. Cl.⁶ ..................................... F02D 7/00
[52] U.S. Cl. ........................................ 123/481
[58] Field of Search .................... 123/481, 399, 123/419; 364/431.01; 180/197

[56] References Cited

U.S. PATENT DOCUMENTS

| | | | |
|---|---|---|---|
| 4,459,968 | 7/1984 | Brandt et al. ............ | 123/603 |
| 4,616,617 | 10/1986 | Geiger et al. ........... | 123/436 |
| 4,690,124 | 9/1987 | Higashiyama ............ | 123/643 |
| 4,870,587 | 9/1989 | Kumagai ............ | 364/431.07 |
| 4,875,452 | 10/1989 | Hara et al. ............ | 123/488 |
| 4,889,094 | 12/1989 | Beyer et al. ............ | 123/414 |
| 4,998,522 | 3/1991 | Achleitner ............ | 123/491 |
| 5,067,462 | 11/1991 | Iwata et al. ............ | 123/414 |
| 5,074,271 | 12/1991 | Suzuki et al. ............ | 123/491 |
| 5,099,816 | 3/1992 | Ohga et al. ............ | 123/481 |
| 5,099,942 | 3/1992 | Kushi et al. ............ | 180/197 |
| 5,154,151 | 10/1992 | Bradshaw et al. ............ | 123/481 |
| 5,174,267 | 12/1992 | DeBiasi ............ | 123/643 |
| 5,186,144 | 2/1993 | Fukui ............ | 123/414 |
| 5,205,255 | 4/1993 | Yamagata et al. ............ | 123/331 |
| 5,213,081 | 5/1993 | Fujimoto ............ | 123/419 |
| 5,267,544 | 12/1993 | Ohkumo et al. ............ | 123/544 |
| 5,284,124 | 2/1994 | Moriyama et al. ............ | 123/643 |
| 5,370,099 | 12/1994 | Koelle et al. ............ | 123/603 |
| 5,437,253 | 8/1995 | Huffmaster et al. ............ | 123/399 |
| 5,481,461 | 1/1996 | Miyamoto et al. ............ | 364/431.01 |
| 5,483,941 | 1/1996 | Cullen et al. ............ | 123/481 |
| 5,492,100 | 2/1996 | Ishii et al. ............ | 123/481 |
| 5,526,793 | 6/1996 | Johansson ............ | 123/481 |

FOREIGN PATENT DOCUMENTS

| | | | |
|---|---|---|---|
| 4033148 | 4/1991 | Germany ............ | 123/481 |
| 4143094 | 7/1992 | Germany ............ | 123/481 |
| 2255831 | 11/1992 | United Kingdom . | |
| 89/08778 | 9/1989 | WIPO ............ | 123/481 |

OTHER PUBLICATIONS

Japanese Patent Abstract No. JP880019803 (Kazumasa), dated Jul. 8, 1989.

*Primary Examiner*—Raymond A. Nelli
*Attorney, Agent, or Firm*—Herbert L. Lerner; Laurence A. Greenberg

[57] ABSTRACT

In a method of identifying stroke positions and for synchronizing sequential fuel or ignition distribution to cylinders of a four-stroke internal combustion engine with an even number of cylinders, as a function of signals of a crankshaft sensor, pistons of two cylinders each having the same position and direction of motion always form one group. Fuel injection and ignition is jointly carried out for each group from engine starting until a predetermined engine operating state is reached. Either fuel injection or ignition of a predetermined cylinder is omitted for at least one engine stroke, once the predetermined engine operating state is reached. If combustion does not occur within two engine cycles, beginning with the engine stroke in which the fuel injection or the ignition is omitted for the first time, the predetermined cylinder and otherwise the other cylinder of the same group is synchronized. A switch over to sequential fuel injection or ignition is carried out once synchronization has been carried out.

3 Claims, 5 Drawing Sheets

METHOD OF IDENTIFYING THE STROKE POSITIONS IN AN INTERNAL COMBUSTION ENGINE UPON STARTUP

CROSS-REFERENCE TO RELATED APPLICATION

This application is a continuation-in-part of my application Ser. No. 08/296,955, filed Aug. 26, 1994 now abandoned.

BACKGROUND OF THE INVENTION

FIELD OF THE INVENTION

The invention relates to a method of identifying the stroke positions in four-stroke internal combustion engines upon startup and for synchronizing sequential fuel or ignition distribution to the cylinders, as a function of the signals of a crankshaft sensor, wherein two cylinders, with pistons each having the same position and direction of motion, always form one group of cylinders.

In order to identify the cylinders of a multicylinder internal combustion engine, signals from camshaft sensors alone, or from such sensors and additional crankshaft sensors, are typically processed in an engine control unit, as can be learned from U.S. Pat. No. 4,459,968.

Although the order of ignition of the various cylinders is fixed (such as I-III-IV-II in four-cylinder four-stroke engines), nevertheless it extends over two entire revolutions of the crankshaft (CS), with two CS reference signals per engine cycle of 720° CS (also referred to as an operating cycle). Without any reference signal per engine cycle (per camshaft revolution or per two crankshaft revolutions), synchronization (unequivocal association of fuel injection and ignition with the various cylinders) is not possible, since during the same crankshaft position, for instance in a four-cylinder engine when both cylinder I and cylinder IV, or both cylinder II and cylinder III, have the same piston position and direction of piston motion, although in different engine strokes (for instance, cylinder I: compression plus ignition, and cylinder IV: expulsion of the combusted mixture, or vice versa). One engine stroke extends over 180° CS.

Although the engine control unit can trigger the spark plugs and fuel injection valves in a targeted way, nevertheless initially, because of the crankshaft position alone, the correct cylinder cannot be determined exactly, since at a particular crankshaft position, either cylinder I or cylinder IV should be ignited or supplied with fuel, for instance. However, it is not known which of the two cylinders should in fact be served at that time. That would require identification of the correct cylinder (synchronization), which is typically carried out by means of a camshaft sensor.

SUMMARY OF THE INVENTION

It is accordingly an object of the invention to provide a method of identifying the stroke positions of and for synchronizing an internal combustion engine, which overcomes the hereinafore-mentioned disadvantages of the heretofore-known methods of this general type and which is capable of carrying out the synchronization without a camshaft sensor, solely with the aid of a crankshaft sensor or its output signal.

With the foregoing and other objects in view there is provided, in accordance with the invention, an improved method for identifying respective stroke positions of cylinders of a four-stroke internal combustion engine with an even number of cylinders, and for synchronizing sequential fuel injection and ignition distribution to the cylinders, as a function of signals of a crankshaft sensor, wherein pistons of two cylinders each having the same position and direction of motion always form one group. The improvement comprises the following steps:

defining a predetermined engine condition as one at which a starting operation has been ended and the engine is not subject to dynamic rpm changes;

jointly carrying out fuel injection and ignition for each said group of two cylinders from a time of engine start and until the predetermined engine condition is reached;

omitting ignition of a predetermined cylinder for one cylinder stroke, once the predetermined engine condition is reached;

if combustion fails to occur within a stroke following the cylinder stroke in which ignition was omitted for a first time, identifying a stroke position of one of the predetermined cylinders in a same said cylinder group; and subsequently switching over to sequential fuel injection and ignition.

In accordance with a further mode of the invention, the improvement comprises the following alternative steps:

omitting fuel injection of a predetermined cylinder for three strokes, once the predetermined engine condition is reached;

if combustion fails to occur within three engine strokes following a cylinder stroke in which fuel injection was omitted for a last time, identifying a stroke position of one of the predetermined cylinders in a same said cylinder group; and subsequently switching over to sequential fuel injection and ignition.

Other features which are considered as characteristic for the invention are set forth in the appended claims.

Although the invention is illustrated and described herein as embodied in a method of identifying the stroke positions and for synchronizing an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The following description will refer to four-stroke engines. The particular embodiment described herein pertains to a four-cylinder four-stroke engine. Persons of skill in the art will nevertheless be enabled to transfer the teaching to engines with any number of cylinders. The conventional four strokes of the engine are the intake, compression, power, and exhaust strokes, respectively.

Figure 1:
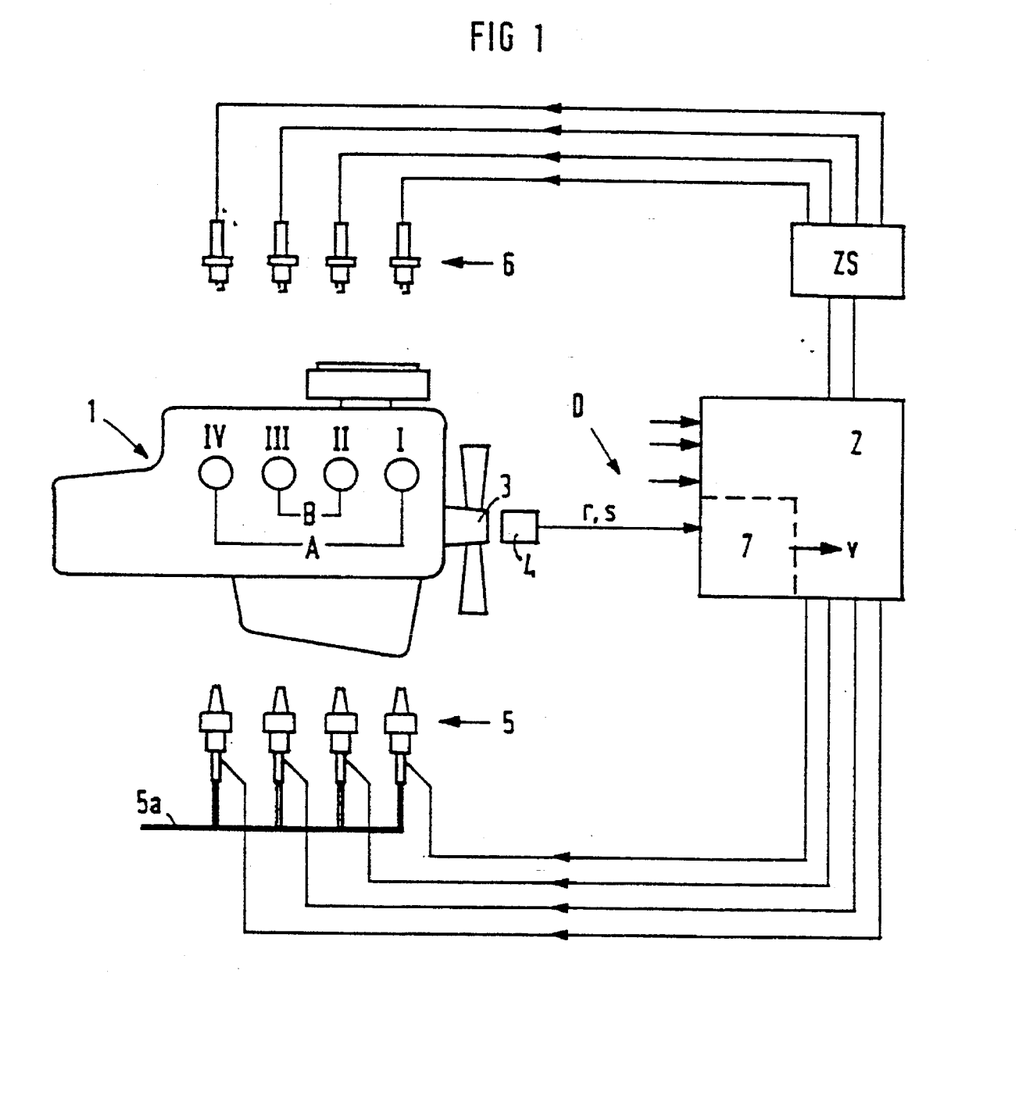
FIG. 1 is a diagrammatic and schematic view of an internal combustion engine with an electronic engine control unit.

Referring now to the figures of the drawing in detail and first, particularly, to FIG. 1 thereof, there is seen an internal combustion engine 1 with four cylinders I, II, III and IV, a crankshaft 3 performing rotary motions which are detected by a crankshaft sensor 4, one fuel injection valve 5 supplied through a fuel line 5a for fuel injection to each individual cylinder, and one spark plug 6 for each cylinder. Actuation of the spark plugs (through one or more ignition coils ZS) and of the injection valves is performed by an electronic engine control unit 2, on the basis of input signals D supplied to it. Electronic engine control units of this type a known in the art, as described, for instance, in U.S. Pat. No. 4,255,789, which is herein incorporated by reference.

These input signals of the engine control unit 2 also include output signals of the crankshaft sensor 4. The input signals include sensor signals s (tooth and/or segment signals) needed by the engine control unit 2 and a reference signal r associated with a particular crankshaft position (this latter signal may be associated with a segment onset, in the case of segment transducers, or a relatively large tooth gap in tooth transducers).

The sensor signals and the reference signal are also delivered to a device 7 which is known per se and which is integrated with the engine control unit 2 in this exemplary embodiment. When a combustion misfire is detected in one of the cylinders of the engine, the device 7 outputs a signal v to other parts of the circuitry of the engine control unit 2.

Possible modes of operation of the device 7 are known from many publications, with one example being Published International Application WO 91/02140. That reference teaches a method for detecting irregular combustions in the cylinders of an internal combustion engine by evaluating what is known as engine roughness, in which the rpm contribution for each cylinder is detected at two specific cylinder positions (after top dead center in the combustion stroke), and an acceleration value for the crankshaft for each engine stroke is ascertained therefrom. Irregular combustion is detected if an acceleration value is below a predetermined limit value.

Through the use of a suitable choice of a limit value g, combustion misfires can be distinguished from normal and "lean" combustions. If an acceleration value is below the limit value, then the device 7 outputs an output signal v.

In order to carry out the method of synchronization without a camshaft sensor, the engine is first operated with groupwise injection and ignition upon starting and from then until a predetermined engine operating state has been established.

The term "groupwise" means that in a four-cylinder engine, for instance, cylinders 1 and 4 are combined into one group A, and cylinders 2 and 3 are combined into another group B. Fuel injection and ignition take place simultaneously in both cylinders of a group. This may be seen from lines b and c in FIGS. 2–4. However, this means that in group A, upon ignition at the proper time for cylinder I, the ignition for cylinder IV takes place in the expulsion stroke (and vice versa), where although it is wrong it causes no damage. The same is true for group B. Groupwise fuel injection in this case means two injection events in one cylinder per ignition, for instance once during the compression stroke and once during the expulsion stroke, always with the inlet valve closed, whereas with the inlet valve opened, the injected quantity of fuel is entrained into the cylinder by the inflowing air. In order not to obtain an overly rich mixture, with groupwise injection (twice per ignition), only half the requisite fuel quantity must be allowed to be injected at a time.

In this exemplary embodiment, predetermined engine operating states are understood to be states in which the starting process has successfully ended, and the engine is in a partial-load range (such as 30%<load<80%) at engine speeds in a range between 1000 and 2000 rpm, and without dynamic changes in rpm.

Every cylinder in a four-stroke engine continuously operates in four strokes per two full crankshaft rotations. The sequence of strokes is (1) suction, (2) compression/ignition, (3) power stroke, and (4) exhaust. In a four-cylinder engine, the sequence of the cylinders is usually I, III, IV, II. Every full crankshaft rotation induces a signal which is associated with a certain position, for instance with dead-top-center (DTC) of cylinder I. The system matrix may be illustrated as follows:

| DTC Cylinder I = | Stroke 1 | Stroke 2 | Stroke 1 (3) | Stroke 2 (4) |
|---|---|---|---|---|
| Cylinder I | Suction | Compression/Ignition | Power | Exhaust |
| Cylinder II | Compression/Ignition | Power | Exhaust | Suction |
| Cylinder III | Exhaust | Suction | Compression/Ignition | Power |
| Cylinder IV | Power | Exhaust | Suction | Compression/Ignition |

It is known from the DTC signals that cylinder I (and cylinder IV, which is in the same group) either compresses and ignites or performs an exhaust stroke during the second stroke following each DTC signal. If cylinder I was not ignited in stroke 2 and no combustion takes place thereafter in stroke 3, it may be concluded that cylinder I was in the compression/ignition stroke during stroke 2 and the further stroke sequence may be determined according to this scheme. Stroke 3 is then the power stoke for cylinder I etc. (see the table above). If combustion did not occur, then cylinder IV combusted and cylinder I was in the exhaust stroke during stroke 2. the synchronization then is according to this scheme: stroke 3 is the suction stroke for cylinder I etc.

A first exemplary embodiment of the method according to the invention will be described in terms of a synchronization process in an engine in which during normal operation (after startup and synchronization) both the fuel injection and the ignition are carried out cylinder-individually (through individual ignition coils).

Figure 2:
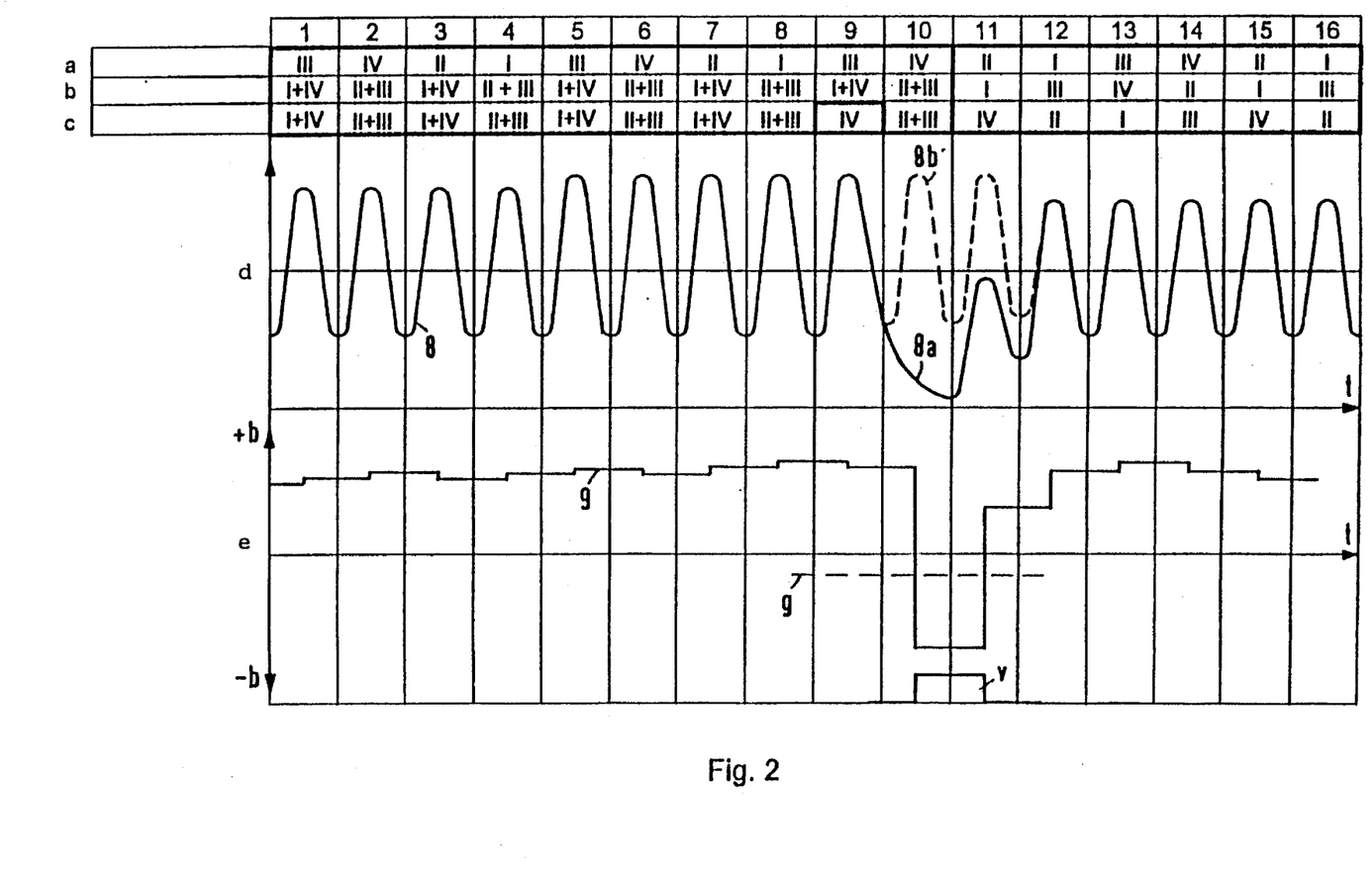
FIG. 2 is a diagram of a mode of operation of a first exemplary embodiment with omission of ignition.
Figure 3:
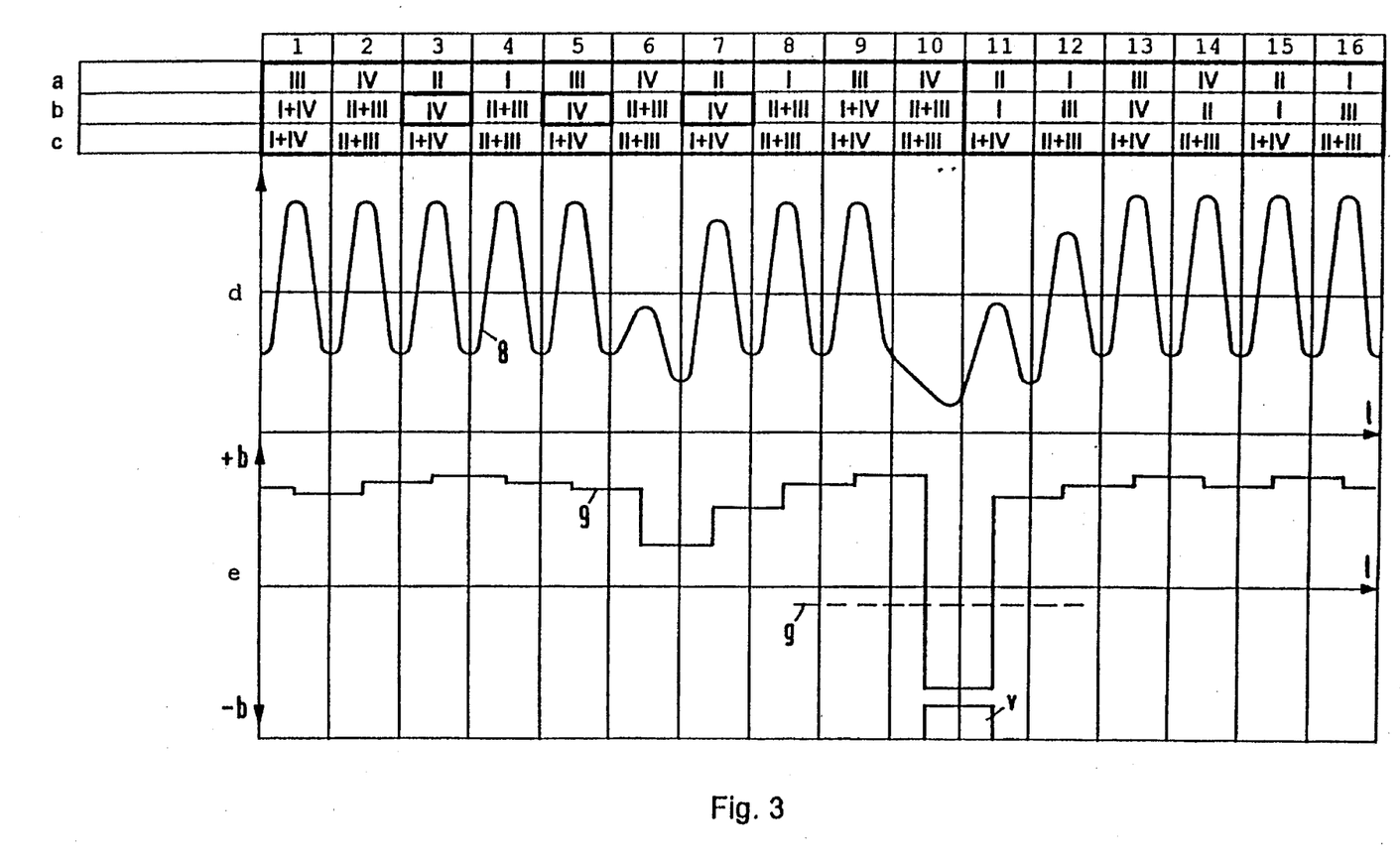
FIGS. 3 and 4 are diagrams of modes of operation of a second exemplary embodiment with omission of fuel injection.
Figure 4:
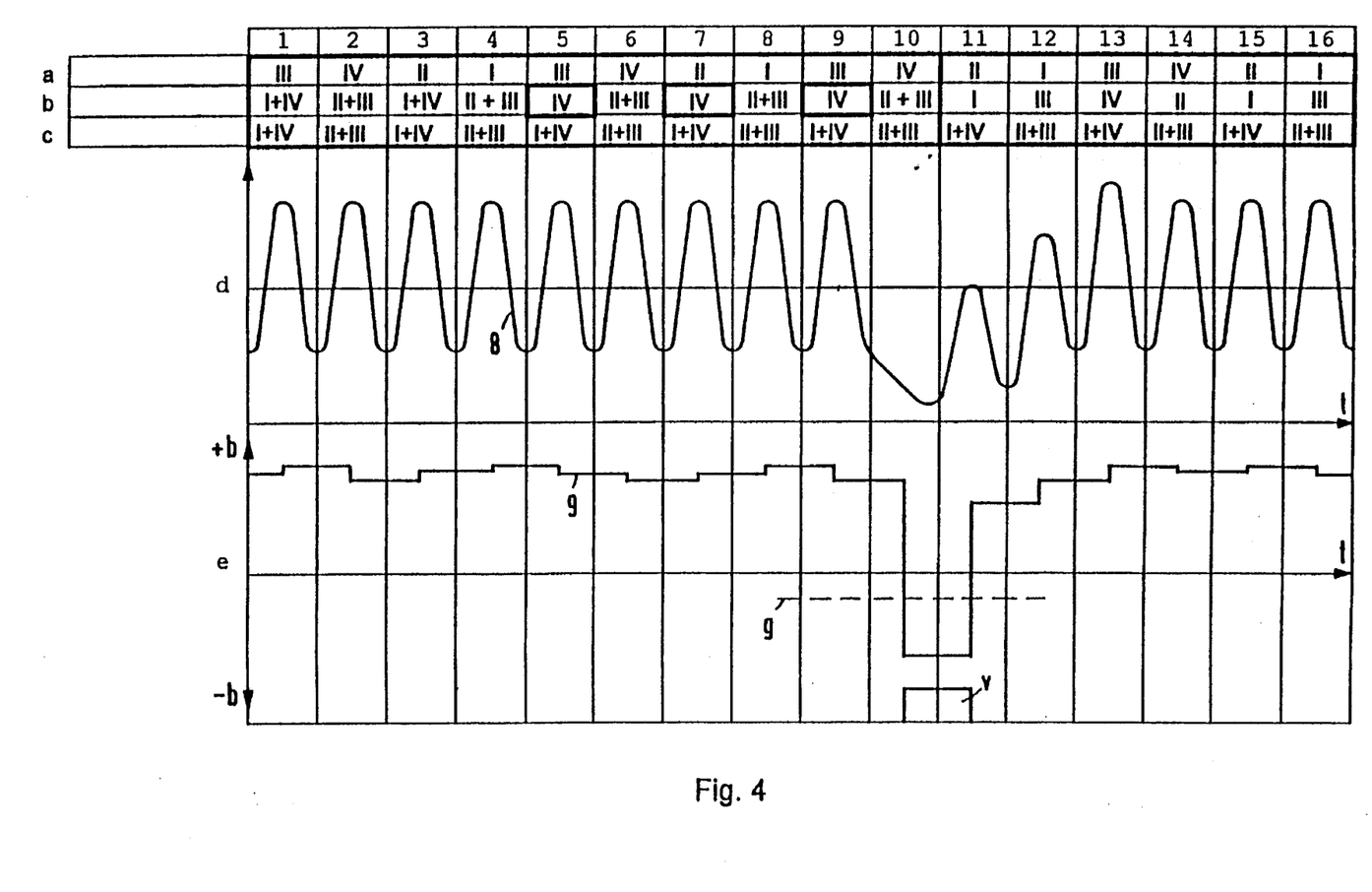

In FIGS. 2–4, lines a-c and diagrams d and e in columns 1–16 are shown. The columns are associated with the individual engine strokes that repeat continuously (in the ignition order I-III-IV-II chosen in this case), as follows:

Col. 1=compression stroke+ignition in cylinder I (I.I)

Col. 2=expansion stroke in cylinder I (=ignition I.III)

Col. 3=power stroke in cylinder I (=ignition I.IV)

Col. 4=intake stroke in cylinder I (=ignition I.II), etc.

The line a indicates the cylinder for which the intake valve is open in the various engine strokes, beginning in column 1 with cylinder III and progressing in the ignition order I-III-IV-II.

The line b indicates when in which cylinders (or the intake nozzles thereof) fuel injections take place. In strokes 1–10, "groupwise" half the fuel quantity is allocated twice each time to the individual cylinders, and from stroke 11 on, the entire quantity is injected at the correct instant, cylinder-individually. At the transition to cylinder-individual injection, care must be taken to ensure that the cylinder which was already supplied with half the fuel quantity before the synchronization again receives only half the fuel quantity upon the first injection after synchronization!

The line c indicates when which cylinders are ignited. Ignition takes place groupwise again in strokes 1–10, and in strokes 11–16 ignition is performed cylinder-individually (FIG. 2) or groupwise (FIGS. 3 and 4). The correct instants of injection for cylinder I should be in strokes 1, 5, 9 and 13.

In the diagram d, a speed of revolution 8 of the crankshaft is plotted over time. In each engine stroke, this speed is accelerated somewhat by the combustion events in the various cylinders and afterward is slowed down again somewhat. If no combustion takes place in an engine stroke (as in stroke 10), then the crankshaft in that stroke is not accelerated but rather it is only slowed down.

The diagram e (which is delayed by approximately one-half of an engine stroke because of the measurement and computational activity) shows positive (+b) or negative (−b) acceleration values 9 of the crankshaft ascertained in the various strokes by the device 7, in each case from two speed values measured during one combustion event. These values 9 are compared with a predetermined limit value g. In the case (as is stroke 10) where an acceleration value 9 is less than the predetermined limit value g, which is equivalent to a certain deceleration value, a signal v is output. However, other known methods may also be used.

In the first exemplary embodiment shown in FIG. 2, fuel injection (indicated in line b) and ignition (indicated in line c) take place groupwise from the beginning of the startup process until synchronization (columns 1–10). If a predetermined operating state is attained (for example in the stroke associated with column 8), then the next ignition in the cylinder I (in the cell outlined by a heavy line at the intersection of the line c and the column 9 in FIG. 2) is suppressed. In the stroke 9, only the cylinder IV is accordingly ignited (in its expulsion stroke). If thereupon in the stroke 10 (combustion misfire in cylinder I) following the ignition, a combustion misfire is ascertained (the acceleration value 9 is less than the limit value g in the diagram e) by the device 7 as a consequence of a measured deceleration (a solid line 8a in diagram d), then this is the decisive indication that in the stroke 9 at the correct ignition point of the cylinder I no ignition has taken place. In other words it is an indication that in a proper order the stroke 9 and every fourth stroke thereafter is the compression and ignition stroke of the cylinder I, and that top dead center attained by the piston after ignition in the cylinder I is the top dead center (ignition top dead center or high-pressure top dead center) at which in this exemplary embodiment the engine control unit 2 now synchronizes the other cylinders in the ignition order I-III-IV-II.

With this synchronization, from the stroke 11 on, the engine control unit 2 can now convert to cylinder-individual fuel injection (taking already-injected partial fuel quantities into account) and ignition, as is shown in the columns 11–16 of the lines b and c, without requiring a camshaft reference signal for that purpose.

However, if the instant of ignition in the stroke 9 were not the correct instant of ignition for the cylinder I but rather for the cylinder IV, and therefore if it were the expulsion stroke for the cylinder I, then the omitted ignition in the cylinder I (in its expulsion stroke) could not hinder combustion (in the cylinder IV) in the ensuing stroke 10, and that combustion would take place (curve 8b shown in dashed lines in diagram d). However, that would then be the indication that ignition has taken place in the expulsion stroke of the cylinder I. In other words, as a consequence, it is not the stroke 9, but rather the stroke 7 and every fourth stroke thereafter, that would be the compression and ignition stroke of the cylinder I to which, or to the top dead center following it, the engine control unit 2 would have to synchronize, and with this synchronization would then, from the stroke 11 on, have to change over to cylinder-individual fuel injection and ignition.

A second exemplary embodiment will be described in conjunction with FIGS. 3 and 4 for an engine in which the engine control unit omits the fuel injection in the presence of a predetermined operating state for carrying out the synchronization, and in normal operation (after startup and synchronization) changes to cylinder-individual fuel injection but continues to carry out the ignition groupwise, for instance for the reason that the ignition is equipped with a double-spark ignition coil. However, once again the engine control unit could function with cylinder-individual ignition without impairing its mode of operation.

In FIG. 3: If during the groupwise injection and ignition a predetermined operating state is attained, in this case in the stroke 3 by way of example, then the next three fuel injections into the cylinder I will be omitted in the strokes 3, 5 and 7 (cells outlined with a heavy line in line b, column 3, 5 and 7). The consequence of this is that the ignition in the stroke 5 following the first omitted injection (stroke 3) is followed by a "lean" combustion in the stroke 6, since the cylinder I received half the fuel quantity in the stroke 2 but did not receive it as well in stroke 3. This is expressed in a lesser acceleration (stroke 6 in diagram e), which however, is not below the limit value g.

The next (correctly timed) ignition in stroke 9 is now followed in the stroke 10 by a combustion misfire, since after all no fuel was injected into the cylinder I in the strokes 5 and 7. Once again, this is the decisive indication that the stroke 9 preceding the combustion misfire and every fourth stroke following it is the compression and ignition stroke of the cylinder I, and that top dead center reached by the piston in the cylinder I after the ignition is accordingly the top dead center to which, in this exemplary embodiment as well, the other cylinders are synchronized in the ignition order I-III-IV-II.

Thus from the stroke 11 on, a change to cylinder-individual fuel injection can be made, as is shown in the columns 11–16 in the line b, without requiring a camshaft reference signal for that purpose in this case either.

FIG. 4 shows the same second exemplary embodiment, on the assumption that the predetermined operating state is first reached in the stroke 5. In this case the ensuing three fuel injections into the cylinder I are omitted in the strokes 5, 7 and 9 (heavily outlined cells in line b, columns 5, 7 and 9). The ignition in the stroke 9 that follows the first and second omitted injection (strokes 5 and 7) is now followed in the stroke 10 by a combustion misfire, so that in this case as well it follows that the stroke 9 preceding the combustion misfire and every fourth following stroke is the compression and ignition stroke of the cylinder I, and that the top dead center reached by the piston in the cylinder I after the ignition is accordingly the top dead center to which the engine control unit 2, in this exemplary embodiment as well, synchronizes the other cylinders in the ignition order I-III-IV-II.

The omitted fuel injection in the stroke 9 is not followed by lean combustion in the stroke 14, since after the changeover to cylinder-individual fuel injection from the stroke 11 on, the full quantity of fuel is allocated to the cylinder I from the stroke 11 on and in every fourth stroke thereafter.

Since known engine control units are typically equipped with microprocessors in order to handle the complex computational and control operations, the changes or additions to be made to carry out the described method of synchronization can be attained essentially by changes and additions to the existing microprocessor programs.

Figure 5:
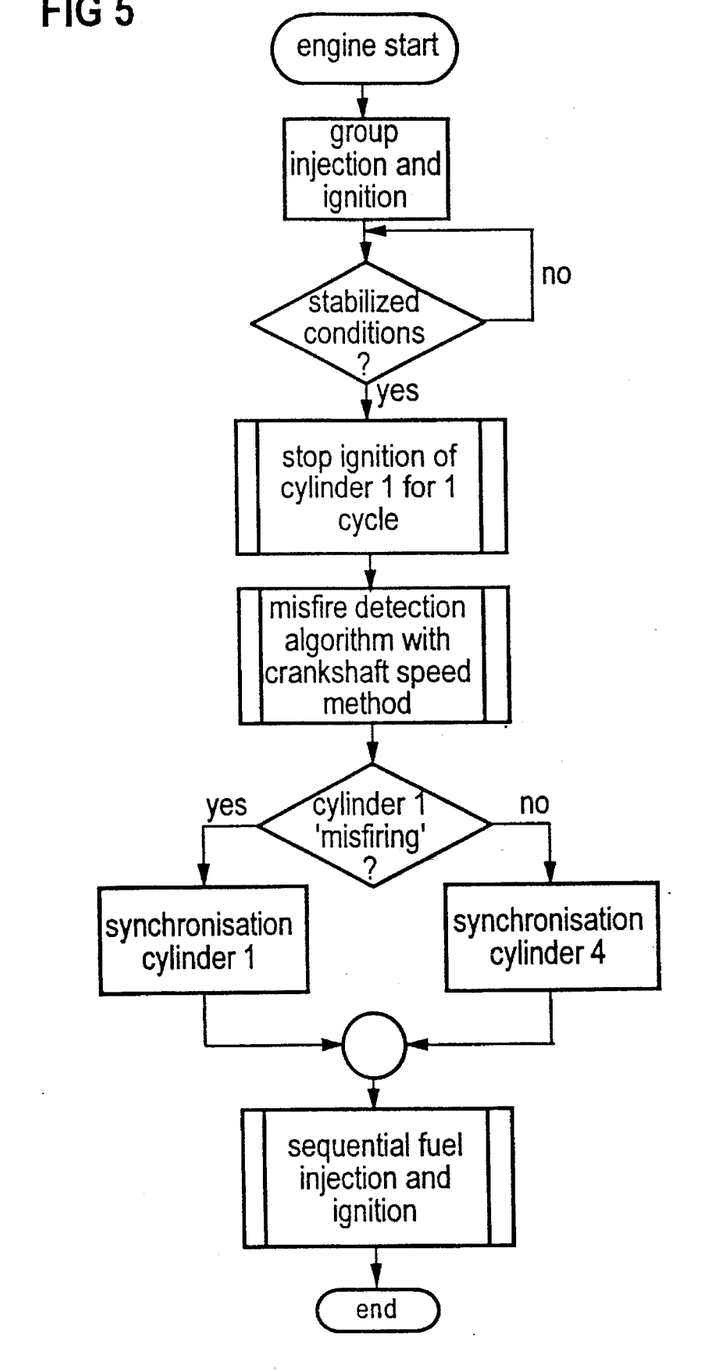
FIG. 5 is a flowchart showing an exemplary synchronizing subroutine by ignition.

FIG. 5 is a flowchart illustrating a subroutine of synchronizing without a camshaft sensor. The specific process is performed by omitting ignition (i.e. synchronizing by ignition). The process subroutine can be quite simply converted to synchronizing by injection.

After the engine has been cranked, a group of cylinders is simultaneously subjected to injection and ignition. The engine control then queries for the status of the engine, i.e., are the running conditions stabilized. Fuel injection and ignition are performed in groups during the starting procedure until a predetermined engine condition is reached. The predetermined engine condition, in the exemplary embodiment, is defined by the load (between 30% and 80%) on the engine, by the speed of the engine, and by the requirement that the engine speed is not dynamically changing (the speed gradient should be zero).

The subject process starts upon receiving the YES to that query. First, ignition is stopped for cylinder I, for one cycle. The misfire detection algorithm is then performed on the crankshaft speed output—with the result giving a definite answer whether cylinder I misfired or not. Depending on the answer, it is now possible to continue with the sequential injection and ignition with the correct association of the respective strokes to the otherwise ambivalent position of the pistons (ambivalent here means that a TDC position of a given piston may be the beginning of the power stroke or of the intake stroke).

In other words, once the defined and predetermined engine condition has been reached (a YES is returned to the query), the ignition (or injection) is omitted for a given cylinder of a given group (here cylinder I or the group I/IV). Any of the cylinders in any of the groups can be determined. In the flowchart, this is done in cylinder I, group A. The engine control, of course, knows in which cylinder the spark occurs or the fuel injection occurs. The engine control does not know at that point whether or not it is the correct cylinder.

As noted above, the term "synchronization" is used herein as the "unequivocal association of fuel injection and ignition with the various cylinders", and as the "identification of the correct cylinder". In yet other words, the method pertains to identifying a stroke position of a piston in the respective cylinder. Stroke position in a four-stroke internal combustion engine refers to one of the four defined strokes.

Once more by way of example: the spark is omitted in cylinder I in engine stroke 9 (the presumed compression stroke of cylinder I as illustrated in FIG. 2); in the next stroke 10, i.e. the presumed working stroke of cylinder I (when the injection is omitted in a stroke within the next two cycles of two times 720° crank angle) there occurs no combustion. This necessarily causes engine speed deceleration. The engine speed (rpm) then must fall below a predetermined threshold g, if cylinder I was actually in its ignition stroke when ignition was omitted, or engine speed does not decelerate if it was not cylinder I, but cylinder IV which was performing its compression stroke while the ignition was skipped in cylinder I. Cylinder I, in that case, combusted.

This determination leads to the identification (if there was no combustion in stroke 10) of the given cylinder I. By identifying one cylinder, of course, all other cylinders are identified as well.

In summary: There appears a reference signal r at every 360° crank angle, i.e. at the TDC of cylinder I and the gear teeth signals s (crankshaft angle) of the crankshaft sensor 4; accordingly, the group strokes are known for each crankshaft rotation. The group stroke 1 is defined from 0°–180° crank angle and the group stroke 2 is defined between 180° and 360° (=0°) crank angle.

Based on the reference signal r at TDC of cylinder I, it is known that the pistons of cylinder I and cylinder IV are moving downwardly in group stroke 1 and upwardly in group stroke 2.

If it is assumed in the example of FIG. 2 (omit ignition) that stroke 9 is a group stroke 2 (compression stroke of cylinder I), because fuel injection and subsequent ignition occur in the group of cylinders I and IV simultaneously (FIG. 2, lines b and c in stroke 9) and ignition is omitted in cylinder I, then one must expect an omitted ignition in the following stroke 10 with an attendant engine speed deceleration, only if the cylinder I was indeed in the compression stroke in stroke 9. If this is the case (compare the crank angle speed with the predetermined threshold g), then the engine control synchronizes accordingly with stroke 9 identified as the compression stroke of cylinder I. If no speed deceleration is found, then it was not cylinder I but instead cylinder IV which was in compression and the engine control synchronizes accordingly with "stroke 9 is the compression stroke of cylinder IV".

I claim:

1. An improved method for identifying respective stroke positions of cylinders of a four-stroke internal combustion engine with an even number of cylinders, and for synchronizing sequential fuel injection or ignition distribution to the cylinders, as a function of signals of a crankshaft sensor, wherein pistons of two cylinders each having the same position and direction of motion always form one group, the improvement which comprises:

defining a predetermined engine condition as one at which a starting operation has been ended and the engine is not subject to dynamic rpm changes;

jointly carrying out fuel injection and ignition for each said group of two cylinders from a time of engine start and until the predetermined engine condition is reached;

omitting ignition of a predetermined cylinder for one cylinder stroke, once the predetermined engine condition is reached;

if combustion fails to occur within a stroke following the cylinder stroke in which ignition was omitted for a first time, identifying a stroke position of one of the predetermined cylinders in a same said cylinder group; and subsequently switching over to sequential fuel injection and ignition.

2. The method according to claim 1, which comprises detecting a combustion that has not occurred if an acceleration value of the crankshaft is less than a predetermined limit value.

3. An improved method for identifying respective stroke positions of cylinders of a four-stroke internal combustion engine with an even number of cylinders, and for synchronizing sequential fuel injection or ignition distribution to the cylinders, as a function of signals of a crankshaft sensor, wherein pistons of two cylinders each having the same position and direction of motion always form one group, the improvement which comprises:

- defining a predetermined engine condition as one at which a starting operation has been ended and the engine is not subject to dynamic rpm changes;
- jointly carrying out fuel injection and ignition for each said group of two cylinders from a time of engine start and until the predetermined engine condition is reached;
- omitting fuel injection of a predetermined cylinder for three strokes, once the predetermined engine condition is reached;
- if combustion fails to occur within three engine strokes following a cylinder stroke in which fuel injection was omitted for a last time, identifying a stroke position of one of the predetermined cylinders in a same said cylinder group; and
- subsequently switching over to sequential fuel injection and ignition.

* * * * *